Aug. 8, 1961            C. A. BEST            2,994,983
TRANSPARENT PLUG WITH INTERCHANGEABLE FISH HOOKS
Filed Aug. 21, 1957
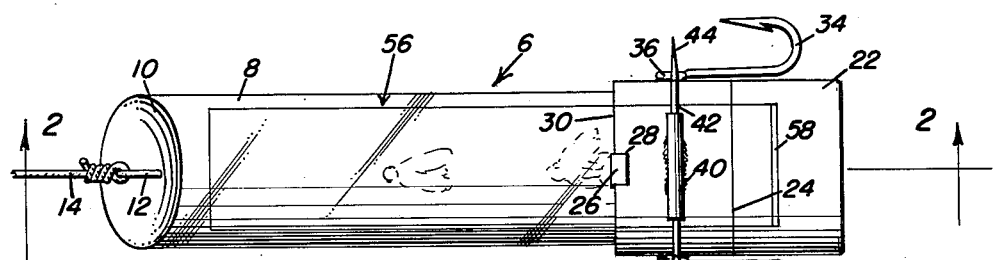
Fig. 1
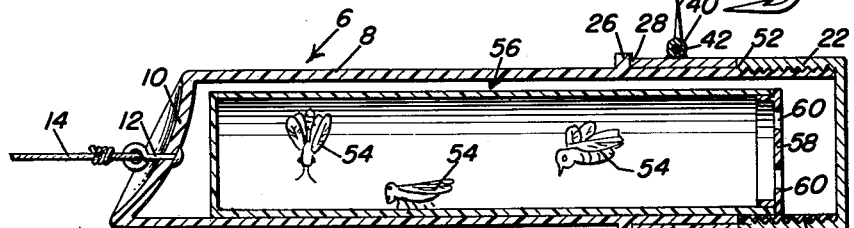
Fig. 2
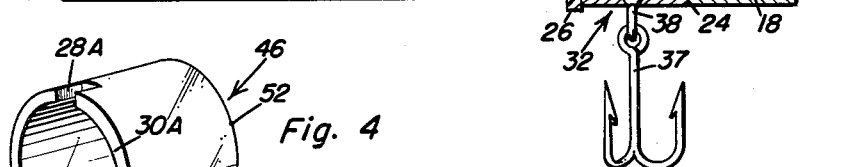
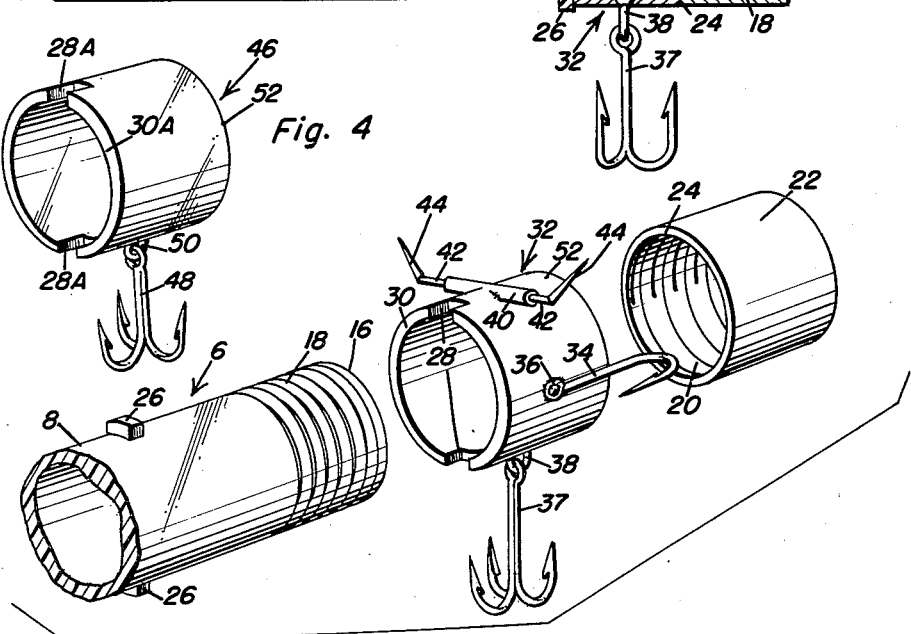
Fig. 4
Fig. 3
Clarence A. Best
INVENTOR.
BY *Clarence A. O'Brien*
*and Harvey B. Jacobson*
Attorneys

United States Patent Office 2,994,983
Patented Aug. 8, 1961

2,994,983
TRANSPARENT PLUG WITH INTERCHANGEABLE FISH HOOKS
Clarence A. Best, P.O. Box 341, New Albany, Ind.
Filed Aug. 21, 1957, Ser. No. 679,364
2 Claims. (Cl. 43—41)

The present invention relates to an improved fishing lure, more particularly, to a hollow transparent body or plug which features novel adaptations which combine in providing maximum utility and attractive properties which, conjointly considered, induce fish to strike at the plug.

Casting and trolling plugs are known to be of infinite shapes, colors and styles and are made to simulate baits of various kinds and hence are popular and have met with wide-spread adoption and use. As the preceding statement implies, the instant concept has to do with a plug which is transparent and is likewise hollow to accommodate attractive inserts whether animate or inanimate. In carrying out this aspect of the concept live creatures such as horseflies, bees, grasshoppers and insects and bugs generally will be placed in a transparent container such as a capped bottle and the latter will be placed in the space in the body for display purposes. This aspect of the invention is thought to be advantageous in that it enables the angler to catch and confine the live "bait" in the capped and vented bottle for practical and convenient transportation and subsequent use.

Novelty is also predicated on the appropriation and use of a bait-charged transparent plug the rearward end of which is closed by a removable cap, said cap having the additional function of an abutment or a shoulder in that it engages a cooperating edge of a collar or equivalent replaceable retainer, said retainer encircling the plug and being held by the cap against shoulder means carried by the plug. The retainer or collar is novel in that it serves as a holder or carrier for one or more fish hooks. Most anglers have occasion to use fish hooks of varying sizes. That is to say, the average angler will purchase for use a set of some seven more or less different sizes of fish hooks. In keeping with the present invention an attaching or retainer collar will be provided for each distinct fish hook, or group of fish hooks. This will make it possible to employ one bait loaded plug and to provide a plurality of interchangeable fish hook retainers all of which are adapted to fit on the one plug. Consequently, a significant objective is that which involves the use of interchangeable or replaceable hook-equipped collars.

Other objects, features and advantages will become more readily apparent from the following description and the accompanying drawing.

In the drawing wherein like numerals are employed to designate like parts throughout the views:

FIG. 1 is a plan view of a fishing plug constructed in accordance with the invention;

FIG. 2 is a lengthwise section on the longitudinal line 2—2 of FIG. 1;

FIG. 3 is an exploded perspective view of the essential components with the hollow body or plug fragmentarily shown; and FIG. 4 is a perspective view of an alternate fish hook holder or collar.

The plug proper is denoted by the numeral 6 and comprises a hollow transparent elongated body 8 which is shown to be cylindrical or circular in cross section but may be of some other cross sectional shape. The forward or leading end is cut or formed on an oblique angle and is dished at 10. This functions as a deflecting baffle and imparts motion to the plug as it is drawn or otherwise moved through the water. An eye-equipped fastener 12 is swively attached to the central portion of the forward end to accommodate a fishing line 14. The rearward end of the body is normally opened at 16 and is internally screw-threaded at 18 to accommodate the screw threads 20 on the closing cap 22. When the cap is in place the forward edge or end 24 is spaced rearwardly from shoulder means carried by the body. Specifically the shoulder means comprises a pair of diametrically opposite integral outstanding lugs 26 which serve as keepers. These lugs are adapted to keeper notches 28 formed diametrically in the forward end 30 of the fish hook holding and carrying means. This means is preferably in the form of an endless collar, ring or equivalent member 32. In the form thereof seen in FIG. 3, the collar is provided on diametrically opposite sides with relatively small fish hooks 34 welded or otherwis secured in place at 36 and having their rearward or barbed ends projecting beyond the rear end of the collar and also radiating beyond diametrically opposite sides of the over-all plug. These hooks may often be used as live bait hooks. That is to say, they may be baited if so desired. The primary fishing hook is of course the multiple-prong hook 37 which is hingedly attached at 38 to what may be called the bottom of the collar. On the top of the collar there is a fixed socket member 40 into which shank portions 42 of the suitably angled prongs or spurs 44 are fitted and fixed. These spurs actually serve as spears and experience shows that they have invariably increased the chances of making a satisfactory catch and that they function to hold a big fish trying to wiggle and yank himself off of the small baited hooks. It is repeated that the angler in practice will purchase a number of collars each of different construction. For example, the collar may be of the type denoted at 46 in FIG. 4 which simply has a single multiple pronged fish hook 48 hingedly attached thereto at 50. This collar is otherwise the same as the one already described and therefore the keeper notches 28A in the forward edge 30A are standardized to fit the lugs 26. Also the rearward edge in both collars is denoted at 52 and is the same and is adapted to abut the shoulder forming edge 24 of the screw cap 22. Thus, the collar may be said to be interposed between the cap shoulder 24 on the one side and the shoulder forming lugs or keepers on the other side. The collar is interchangeable and replaceable in the manner and for the purposes already described.

It is within the purview of the invention to construct the plug of a suitable grade of commercial plastics resorting to varying color schemes or the decorations so desired. The "inserts" may be animate or inanimate. As a general rule and by preference live bugs and insects will serve the needed purposes. These bugs are denoted by the numeral 54 and they are preferably confined in what may be described as a transparent suitably vented bottle or similar container 56. This serves not only as a receiver or container when used in the manner in FIGURE 2, it is also a highly practical device for storing and carrying the insects from one's home to the place of fishing. The removable cap 58 is shown provided with circulating holes or vents 60.

Minor changes in shape, size and rearrangement of parts may be resorted to in actual practice without departing from the spirit of the invention or the scope of the invention as claimed.

What is claimed as new is as follows:

1. A fishing plug comprising an elongated hollow body of transparent material closed at a forward end and open at a rearward end, the hollow portion of said body defining an elongated chamber, a transparent live bait containing bottle fitted removably into said chamber and insertable and removable by way of said open end, said bottle having a removable ported cap, a readily applicable and removable closing cap for the open end of said body, said cap being imperforate and having a disk portion bering against the open end of the body and also having a rim portion exteriorly encircling a limited portion of the rear end of the body, said rim portion being of uniform thickness that the exposed forward end thereof provides an outstanding stop shoulder, the exterior surface portion of a median part of said body being provided with diametrically opposite projecting radial lugs constituting keepers, said lugs being spaced forwardly from said stop shoulder when said closing cap is secured on the body in the normal position, a readily applicable and removable collar completely encircling and fitted around said body and of a size to fully occupy the space between the stop shoulder and said lugs, said collar being of a length approximately equal to the length of said rim the rear end of the collar engaging said stop shoulder and the forward end thereof having diametrically opposite longitudinally extending keeper notches, and said collar being replaceable by similar collars and being provided with a variety of sizes and types of fishhooks.

2. A fishing plug comprising an elongated hollow body of transparent material circular in cross section, closed at its forward end and open at its rearward end, the hollow portion of said body defining a chamber, said rearward end being externally screw threaded, a transparent live bait containing bottle fitted removably into said chamber and insertable and removable by way of the open end of the body, a removable closing cap for the open end of said body, said cap being imperforate and likewise circular in cross section and cup-like in shape and having an annular rim portion internally screw threaded and screwed on the screw threaded portion of said body and having a disk portion abutting the adjacent end of the body and serving to hold said bottle in place in said chamber, the forward end of said rim constituting an endless stop shoulder, the exterior surface of said body being provided with a pair of fixedly mounted diametrically opposite outstanding lugs which are spaced forwardly from the rim of said cap when the same is secured on the body in the normal position and which constitute keepers, a readily applied ring-like collar snugly but removably encircling the portion of said body between the lugs and rim of said cap and having its rearward end abutting said stop shoulder and having its forward end provided with circumferentially spaced longitudinally extending keeper notches opening through said forward end and into which the lugs are removably fitted, said collar spanning the space between the lugs and stop shoulder and being provided exteriorly with at least one fishhook, said collar being of uniform thicknss from end-to-end and also of a length about the same as the length of said rim.

References Cited in the file of this patent
UNITED STATES PATENTS

| | | |
|---|---|---|
| 2,070,755 | Seigle et al. | Feb. 16, 1937 |
| 2,217,565 | Seigle et al. | Oct. 8, 1940 |
| 2,510,566 | Flaherty | June 6, 1950 |
| 2,528,083 | Ruff | Oct. 31, 1950 |
| 2,736,981 | Bonanno | Mar. 6, 1956 |